US011668785B2

(12) United States Patent
Wolf et al.

(10) Patent No.: US 11,668,785 B2
(45) Date of Patent: Jun. 6, 2023

(54) METHOD FOR LOCATING A CONNECTED OBJECT BY PHASE DIFFERENCES OF ARRIVAL IN AN LPWA NETWORK

(71) Applicant: COMMISSARIAT A L'ENERGIE ATOMIQUE ET AUX ENERGIES ALTERNATIVES, Paris (FR)

(72) Inventors: Florian Wolf, Grenoble (FR); Sébastien De Rivaz, Grenoble (FR); François Dehmas, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 197 days.

(21) Appl. No.: 17/318,185

(22) Filed: May 12, 2021

(65) Prior Publication Data
US 2021/0356553 A1    Nov. 18, 2021

(30) Foreign Application Priority Data

May 13, 2020 (FR) ..................................... 20 04730

(51) Int. Cl.
| | |
|---|---|
| G01S 5/06 | (2006.01) |
| G01S 5/02 | (2010.01) |
| H04W 64/00 | (2009.01) |

(52) U.S. Cl.
CPC ................ G01S 5/06 (2013.01); G01S 5/021 (2013.01); G01S 5/02213 (2020.05); H04W 64/00 (2013.01)

(58) Field of Classification Search
CPC ...... G01S 5/06; G01S 5/02213; G01S 5/0218; G01S 5/021

(Continued)

(56) References Cited

U.S. PATENT DOCUMENTS

| 4,433,335 A | * | 2/1984 | Wind | ........................ | G01S 5/06 |
| | | | | | 342/453 |
| 5,512,908 A | * | 4/1996 | Herrick | ..................... | G01S 5/12 |
| | | | | | 342/451 |

(Continued)

FOREIGN PATENT DOCUMENTS

| DE | 10 2007 043 649 A1 | 7/2009 | | |
| FR | 3100893 A1 * | 3/2021 | ............. | G01S 13/84 |

(Continued)

OTHER PUBLICATIONS

Wolf, et al. "Comparison of Multi-Channel Ranging Algorithms for Narrowband LPWA Network Localization." 2019 The 5th International Symposium on Ubiquitous Networking (UNet), Nov. 2019, Limoges, France, hal-02515127 (Year: 2019).*

(Continued)

*Primary Examiner* — Gregory C. Issing
(74) *Attorney, Agent, or Firm* — Oblon, McClelland, Maier & Neustadt, L.L.P.

(57) ABSTRACT

A method for locating a connected object within an LPWA network using a plurality of base stations. The connected object transmits packets in RF frequency channels forming a virtual band being scanned once in the uplink direction and once in the downlink direction in a symmetrical manner. The base stations receiving the signal perform an RF to intermediate frequency translation and then a baseband translation in digital mode. The phase differences of arrival for each pair of base stations and the attenuation coefficients of each transmission channel between the connected object and each base station enable a composite transfer function to be constructed for each pair of base stations. The peaks of highest amplitude are detected in the corresponding impulse responses and the distance differences between the connected object and the different base stations are derived (Continued)

therefrom. The position of the object is then estimated by hyperbolic trilateration.

12 Claims, 5 Drawing Sheets

(58) Field of Classification Search
USPC .................................................. 342/463, 465
See application file for complete search history.

(56) References Cited

U.S. PATENT DOCUMENTS

| | | | | |
|---|---|---|---|---|
| 5,610,615 A * | 3/1997 | Chiodini | .............. | H04B 7/1855 342/357.78 |
| 6,243,587 B1 * | 6/2001 | Dent | ..................... | H04W 64/00 455/503 |
| 8,456,362 B2 * | 6/2013 | Izumi | ..................... | H04B 7/086 342/465 |
| 11,140,651 B2 * | 10/2021 | Ayyalasomayajula | ....................... | G01S 5/0218 |
| 2005/0184907 A1 * | 8/2005 | Hall | ......................... | G01S 5/06 342/465 |
| 2010/0220011 A1 * | 9/2010 | Heuser | .................. | G01S 5/0273 342/386 |
| 2011/0111751 A1 * | 5/2011 | Markhovsky | ......... | G01S 13/878 455/423 |
| 2012/0013509 A1 * | 1/2012 | Wisherd | ................... | G01S 5/06 342/451 |
| 2015/0097732 A1 * | 4/2015 | Hill | ....................... | G01S 5/0215 342/465 |
| 2019/0227158 A1 | 7/2019 | Kilian et al. | | |

FOREIGN PATENT DOCUMENTS

| | | | | |
|---|---|---|---|---|
| GB | | 2445595 A * | 7/2008 | ........... G01S 5/0009 |
| WO | WO-2018167231 A1 * | | 9/2018 | ........... G01S 5/0252 |

OTHER PUBLICATIONS

Wolf, et al. Coherent multi-channel ranging for narrowband LPWAN: simulation and experimentation results. In: 15th Workshop on Positioning, Navigation and Communications (WPNC), pp. 1-6, Oct. 2018 (Year: 2018).*

U. Raza et al., "Low Power Wide Area Networks: An Overview," in IEEE Communications Surveys & Tutorials, vol. 19, No. 2, pp. 855-873, Second quarter 2017, doi: 10.1109/COMST.2017. 2652320. (Year: 2017).*

French Preliminary Search Report dated Jan. 25, 2021 in French Application 20 04730 filed on May 13, 2020, 2 pages (with English Translation of Categories of Cited Documents).

Wolf et al., "Coherent Multi-Channel Ranging for Narrowband LPWAN: Simulation and Experimentation Results", 15$^{th}$ Workshop on Positioning Navigation and Communications (WPNC), IEEE, 2018, 6 pages.

Pichler et al., "Multi-Channel Distance Measurement With IEEE 802.15.4 (ZigBee) Devices", IEEE Journal of Selected Topics in Signal Processing, vol. 3, No. 5, Oct. 2009, pp. 845-859.

* cited by examiner

METHOD FOR LOCATING A CONNECTED OBJECT BY PHASE DIFFERENCES OF ARRIVAL IN AN LPWA NETWORK

TECHNICAL FIELD

The present invention relates to the general field of locating objects and in particular connected objects in a narrowband LPWA (Low Power Wide Area) network such as a LoRa, SigFox or NB-IoT network.

STATE OF PRIOR ART

The geolocation of connected objects has become an important issue in the field of IoT (Internet of Things). It allows especially to enrich information transmitted by these objects with locating information, to manage the network more efficiently and develop geographical tracking applications when the objects are mobile.

A first geolocation possibility consists in equipping connected objects with GNSS (Global Navigation Satellite System) reception modules. However, this option is costly and is generally not compatible with the very strict energy consumption requirements of these objects. Furthermore, it is excluded when connected objects are deployed in an indoor environment.

A second geolocation possibility is to perform trilateration from radio signals transmitted by the connected objects and received by different base stations. However, the signals transmitted in LPWA networks, whether they use a licensed (NB-IoT) or unlicensed (SigFox, LoRa) band, are low rate and narrow band to propagate over long distances (up to several kilometres). The fact that the radio signals emitted are narrowband leads to a significant inherent limitation in the time of arrival (ToA) resolution of these signals and therefore to a low distance resolution of the position of the connected objects. This low time resolution can especially lead to large position errors when the transmission channels are multipath, insofar as the different paths cannot be discriminated.

In the field of radar, it is known to measure a distance to a target using a plurality of narrow band signals, so as to avoid the need for high frequency ADC converters. More precisely, this technique (known as stepped frequency radar) consists in varying the carrier frequency of the transmitted signal by successive hops while maintaining an instantaneous narrow band, the complex response being then measured for each carrier frequency. By coherently combining the measurements, or more precisely by performing an inverse Fourier transform of the measurements obtained in this way, an impulse response of the channel in the time domain is obtained. The temporal resolution is then inversely proportional to the virtual frequency bandwidth scanned and no longer proportional to the instantaneous bandwidth. A similar technique, called "coherent multi-channel ranging", has been applied in Low Rate Wireless Personal Area Network (LR WPAN) networks to determine the position of ZigBee transponders, as described in the paper by M. Pichler et al. entitled "Multi-channel distance measurement with IEEE 802.15.4 (ZigBee) devices" published in IEEE Journal of selected topics in signal processing, Vol. 3, No. 5, October 2009, pp. 845-859. However, the aforesaid paper resorts to strong restrictive hypotheses on the propagation scenario, namely a line-of-sight (LOS) situation and the absence of multipath.

The previous technique was used to estimate the distance between a connected object and a base station in an LPWA network and, by trilateration using several base stations, to estimate the position of this object. This method, known as Phase of Flight (PoF) measurement, was described in the paper by F. Wolf et al. entitled "Coherent multi-channel ranging for narrowband LPWAN: simulation and experimentation results", Proc. of 15th Workshop on Positioning, Navigation and Communication (WPNC), 2018, pp. 1-6. The advantage of this method lies in the fact that phase and frequency offsets between the connected object and the different base stations can be dispensed with by means of a round-trip transmission of a packet between the connected object and each node. However, it assumes that the IoT network allows such bi-directional transmissions and furthermore requires the transmission of a large number of packets, a number that increases with the number of base stations involved in locating. Furthermore, the risk of collisions between packets, especially if the network is dense, can lead to a significant degradation of network performance.

Another locating method that does not require synchronisation between the node to be located and the base stations, while allowing reduction in the number of packets to be transmitted, has been described in patent application DE-A-10 2007 043 649. This method utilises hyperbolic trilateration based on the phase differences of arrival of a packet transmitted by the object to be located.

The principle of hyperbolic trilateration based on time of arrival (ToA) is illustrated in FIG. 1.

A connected object, designated as WSN (Wireless Sensor Network) Node in FIG. 1, is represented in 110 and LPWA base stations in 120. The stations are assumed to be synchronised with each other by means of a same clock. The times of arrival of a packet transmitted by the connected object and received by the base stations subtracted in two by two, in modules 130, the time difference of arrival for two base stations $BS_i$ and $BS_l$ corresponds to a propagation path difference:

$$\Delta d_{il} = c_{light}(t_i^A - t_l^A) \quad (1)$$

where $c_{light}$ is the speed of light.

Assuming that the propagation paths between the connected node and the base stations are in line of sight (LOS), the measurement of the time differences of arrival between at least 3 (resp. 4) base stations enables the position of the object in the plane (resp. space) to be determined, by means of hyperbolic trilateration using the calculation module 140.

In practice, more time difference of arrival measurements are available than the minimum required, so that the system of equations is overdetermined. Quadratic error minimisation techniques with the calculation of a pseudo-inverse matrix are then used to solve the system of equations.

The locating method by time differences of arrival requires the use of broadband signals (which are therefore well defined in time). In contrast, since LPWA networks are narrowband, the virtual band technique mentioned above can be implemented by coherently combining phase difference of arrival measurements between base stations at a plurality of frequencies. In this case, the modules 130 perform a correlation of the signals received at the different frequencies and then an IDFT on the results thus obtained at the different frequencies, before solving the aforesaid system of equations in the calculation module 140.

However, this latter approach requires a reference node (geolocated object) transmitting signals allowing the base stations to synchronise and phase-match each other. However, the addition of such a reference node, moreover located at the intersection of coverage zones of the various base stations participating in locating, does not lend itself well to the context of an LPWA network, especially when it is deployed in an outdoor environment. This synchronisation with the reference node requires additional packets to be transmitted/received, which weighs upon the network load and increases consumption of the base stations. Furthermore, the transmission of the reference node should be synchronous with the node to be located, which is in contradiction with the asynchronous nature of the LPWA network.

It is therefore an object of the present invention to provide a method of accurately locating a connected object in an LPWA network that does not require a large number of packets to be transmitted nor does it require accurate synchronisation of base stations by means of a reference node.

DISCLOSURE OF THE INVENTION

The present invention is defined by a method for locating a connected object in an LPWA network using a plurality of base stations, the connected object transmitting an RF signal comprised of a sequence of packets in a plurality of frequency channels forming a virtual band, the virtual band being scanned a first time according to a first channel sequence and a second time according to a second channel sequence, the first and second channel sequences being time symmetrical, said locating method being specific in that:

(a) each base station performs translation of the RF signal at the channel frequency, sampling of the RF signal translated, and then baseband translation in digital mode by multiplication with phasors, the sampling being synchronous with a general clock, common to all the base stations;

(b) each base station estimates the attenuation coefficient of the transmission channel between the connected object and itself, in baseband, as well as a phase of arrival of a packet, called a phase of arrival, for each frequency channel of the first and second channel sequences;

(c) each base station sums the phases of arrival of packets relating to a same channel but to distinct channel sequences to obtain an averaged phase of arrival for each channel ($\Phi_c^{[T,R_i]}$);

(d) each base station estimates the frequency offset ($\hat{\delta}_f^{[R_i]}$) between its sampling frequency and that of the transmitter, and then corrects the averaged phase of arrival for each channel of a phase error due to this frequency offset, so as to obtain an averaged and corrected phase of arrival ($\Phi'_c^{[T,R_i]}$);

(e) each base station transmits the previously estimated attenuation coefficients and averaged and corrected phases of arrival to a server;

(f) the server calculates, for each pair of base stations of said plurality, the averaged and corrected phase differences of arrival so as to obtain phase differences of arrival ($\{\Phi_c^{[R_i,R_j]} = \Phi_c^{[T,R_i]} - \Phi_c^{[T,R_j]}\}$), for each channel frequency;

(g) the server constructs, for each pair ($BS_i, BS_j$) consisting of a first and a second base station, a composite transfer function ($\tilde{H}^{[R_i,R_j]}$) relating to these two base stations, from the attenuation coefficients of the transmission channel between the connected object and the first base station (respectively the second base station) for the different frequency channels, as well as the phase differences of arrival obtained in the previous step for the said pair of base stations and for these same frequency channels;

(h) the server performs an inverse Fourier transform of each composite transfer function obtained in the previous step so as to obtain a composite impulse response) for each pair of base stations of said plurality;

(i) the server detects the peak of highest amplitude in each of the composite impulse responses and derives therefrom, for each pair ($BS_i, BS_j$) consisting of a first and a second base station, a distance difference ($\Delta d_{ij}$) between the connected object and the first base station, on the one hand, and between the connected object and the second base station, on the other hand;

(j) the server estimates the position of the connected object by hyperbolic trilateration from the distance differences obtained in the previous step.

Advantageously, the first channel sequence is obtained by scanning in the uplink direction and the second channel sequence is obtained by scanning in the downlink direction, the uplink and downlink scans being performed uniformly with a constant frequency hopping ($\Delta f$).

Preferably, in step (a), the baseband translation is performed by multiplying, at the sampling frequency rate, the samples of the RF signal translated, by phasors $\exp(-j2\pi f_c k T_s)$ where $f_c$ is the channel frequency, $f_s = 1/T_s$ is the receiver sampling frequency and k is the sample rank.

According to a preferred alternative, in step (b), estimating the transmission channel coefficient and the phase of arrival of a sample packet is achieved by correlating the sequence of the baseband signal samples with a pilot sequence, the modulus of the correlation result being comprised of the transmitter and receiver gains to obtain said transmission channel coefficient.

Likewise, in step (c), the base station can perform, for each frequency channel, the sum of $\Phi_c^{[T,R_i]} = \phi_c^{[T,R_i]} + \phi_{2C+1-c}^{[T,R_i]}$, $\phi[^{T,R_i}]$ being the phase of arrival of the packet c transmitted at the channel frequency $f_c$ in a first scanning direction and $\phi_{2C+1-c}^{[T,R_i]}$ is the phase of arrival of the packet 2C+1−c transmitted at the channel frequency $f_c$, in a second scanning direction opposite to the first one, K is the number of samples in a packet and C is the number of packets per scanning direction.

In step (d) the averaged phase of arrival $\Phi_c^{[T,R_i]}$ can be corrected by $$\Phi'_c^{[T,R_i]} = \Phi_c^{[T,R_i]} + 4\pi\left(\frac{\hat{\delta}_f^{[R_i]}}{1+\hat{\delta}_f^{[R_i]}}\right)f_c C K T_s$$

where $\hat{\delta}_f^{[T,R_i]}$ is the frequency offset estimated in the same step, $f_c$ is the channel frequency, C is the number of packets per scan, K is the number of samples per packet and $f_s = 1/T_s$ is the sampling frequency.

In any case, in step (g), for each pair of base stations consisting of a first base station $BS_i$ and a second base station $BS_j$, the server constructs the composite transfer function by $\tilde{H}_c^{[R_i,R_j]} = \alpha_c^{[T,R_i]}\alpha_{2C+1-c}^{[T,R_i]}\alpha_c^{[T,R_j]}\alpha_{2C+1-c}^{[T,R_j]}\exp(j\Phi^{[R_i,R_j]})$ where $\alpha_c^{[T,R_i]}$, $\alpha_{2C+1-c}^{[T,R_i]}$ are the attenuation coefficients of the transmission channel between the connected object and the base station $BS_i$ at the channel frequency $f_c$, respectively in the first and second scan, where $\alpha_c^{[T,R_j]}$, $\alpha_{2C+1-c}^{[T,R_j]}$ are the attenuation coefficients of the transmission channel between the connected object and the base station $BS_j$ at the channel frequency $f_c$, respectively in the first and second scan, and where $\Phi_c^{[R_i,R_j]}$ is the phase difference of arrival obtained in step (f) for the base station pair $BS_i, BS_j$, and for the channel frequency $f_c$.

In step (i), the distance difference between the connected object and a first base station $BS_i$ on the one hand, and the connected object and a second base station $BS_j$ on the other hand is typically obtained by $$\Delta d_{if} = \frac{c_{light}}{2} \arg\max_t \left( \left| \tilde{h}^{[R_i, R_j]}(t) \right| \right)$$

where $\tilde{h}^{[R_i,R_j]}(t)$ is the composite impulse response obtained in step (h) for the pair of base stations $BS_i$, $BS_j$, and $c_{light}$ is the speed of light.

The overall clock may be given by a GNSS receiver module equipping each of the base stations of said plurality.

Alternatively, the overall clock can be obtained via the Internet using the NTP protocol from a time server.

Further alternatively, the overall clock may be obtained via a backhaul network of a 5G network.

A second embodiment of the invention further relates to a method for locating a connected object in an LPWA network using a plurality of base stations, the connected object transmitting an RF signal consisting of a sequence of packets in a plurality of frequency channels forming a virtual band, the virtual band being scanned a first time, in accordance with a first channel sequence and a second time in accordance with a second channel sequence, the first and second channel sequences being time symmetrical, said method being specific in that:

(a) each base station performs translation of the RF signal at the channel frequency, sampling of the RF signal translated, and then baseband translation in digital mode by multiplication with phasors, the sampling being synchronous with a general clock, common to all the base stations;

(b) each base station estimates the attenuation coefficient of the transmission channel between the connected object and itself, in baseband, as well as a phase of arrival of a packet, called a phase of arrival, for each frequency channel of the first and second channel sequences;

(c) each base station sums the phases of arrival of packets relating to a same channel but to distinct channel sequences to obtain an averaged phase of arrival for each channel ($\Phi_c^{[T,R_i]}$);

(d) each base station estimates the frequency offset ($\hat{\delta}_f^{[R_i]}$) between its sampling frequency and that of the transmitter, and then corrects the averaged phase of arrival for each channel by a phase error due to this frequency offset, so as to obtain an averaged and corrected phase of arrival ($\Phi'_c{}^{[T,R_i]}$);

(e) each base station transmits the previously estimated attenuation coefficients and averaged and corrected phases of arrival to a server;

(f) the server comprises a previously trained neural network, the attenuation coefficients and the averaged and corrected phases of arrival for each base station of said plurality being provided to the input layer of the neural network and the output layer of the neural network providing an estimate of the position of the connected object.

BRIEF DESCRIPTION OF THE FIGURES

Further features and advantages of the invention will become apparent from a preferred embodiment of the invention, described with reference to the accompanying figures among which.

DESCRIPTION OF THE EMBODIMENTS

In the following, an LPWA (Low Power Wide Area) network as set forth in the introductory part will be considered, for example a LoRa, SigFox or NB-IoT network. These networks are especially characterised by the use of narrow band signals (typically from a hundred Hz to a hundred kHz) and low data rate to allow long range communications (typically from one km to a few tens of km).

The nodes of an LPWA network include, on the one hand, connected objects, also called terminal nodes, and, on the other hand, base stations. A connected object served by a base station exchanges data packets with it over a transmission channel which is generally of the multipath type.

In the following, the signal transmitted by the transmitter of a connected object and received by a base station of the LPWA network will be considered. Values relating to the transmitter (that is the connected object) are conventionally designated by the subscript T and those relating to the receiver (that is a base station) by the subscript R.

The digital baseband signal can be written as:

$$s_{BB}^{[T]}(t) = \sum_{k=0}^{K-1} \Pi_{T_s}(t - t_D^{[T]} - kT_s) s[k] \quad (2)$$

where K is the number of samples of the waveform considered, $\Pi_{T_s}$ is the gate function having width $T_s$, $t_D^{[T]}$ is the instant corresponding to the beginning of the transmission or ToD (Time of Departure), measured with local clock of the transmitter, $T_s$ is the sampling period and $s[k]$ $k=0,\ldots,K-1$, are the samples of the waveform, known a priori to the transmitter as well as the receiver. For example, the waveform may correspond to a synchronisation preamble of a packet, consisting of pilot symbols, or even to an entire packet assuming that demodulation is performed without error.

The baseband samples are then converted by a digital to analogue converter (DAC). The DAC is not synchronised to the reference clock. The relative time course of the local clock used for conversion with respect to the reference clock can be described by means of a frequency offset, $\delta_f^{[T]}$, and a time offset, $t_0^{[T]}$, that is:

$$t^{[T]} = (1 + \delta_f^{[T]})t + t_0^{[T]} \quad (3)$$

The baseband signal is then translated to an intermediate frequency $f_c$, corresponding to the channel c, before being translated to the RF band. Alternatively, the signal can be directly translated to the frequency $F_c^{[T]}=f_{RF}+f_c$ where $f_{RF}$ is the frequency of the RF carrier.

In any case, the transmitted signal can be expressed in complex notation as:

$$s_c^{[T]}(t)=g_c^{[T]}s_{BB}^{[T]}(t^{[T]}) \exp j(2\pi F_c^{[T]}t+\phi c^{[T]}) \quad (4)$$

where $F_c^{[T]}$ is the frequency of the transmitted signal, $\phi c^{[T]}$ represents the phase of the original transmitted signal and $g_c^{[T]}$ is the complex gain of the transmitter. Both the frequency $F_c^{[T]}$ and the sampling rate $f_s=1/T_s$ of the digital analogue converter are obtained from the local clock of the transmitter.

Figure 1:
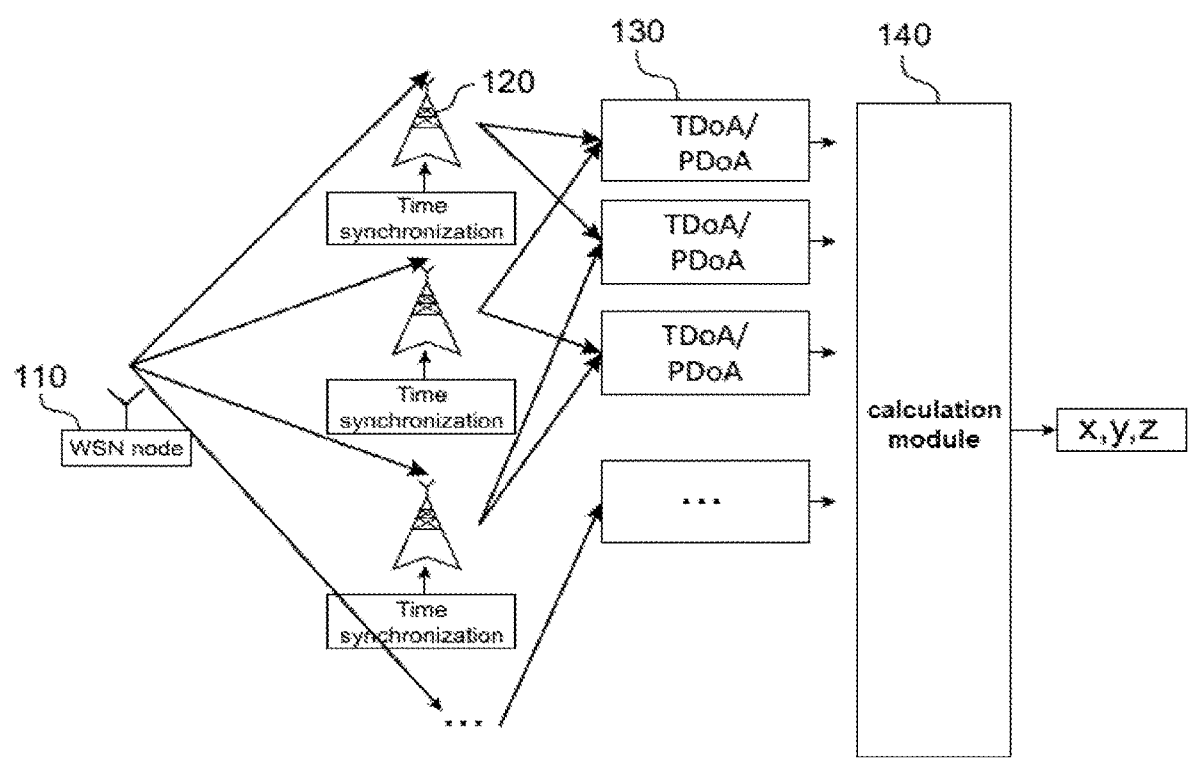
FIG. 1, already described, schematically represents the principle of a hyperbolic trilateration locating in an LPWA network, known from the state of the art.
Figure 2:
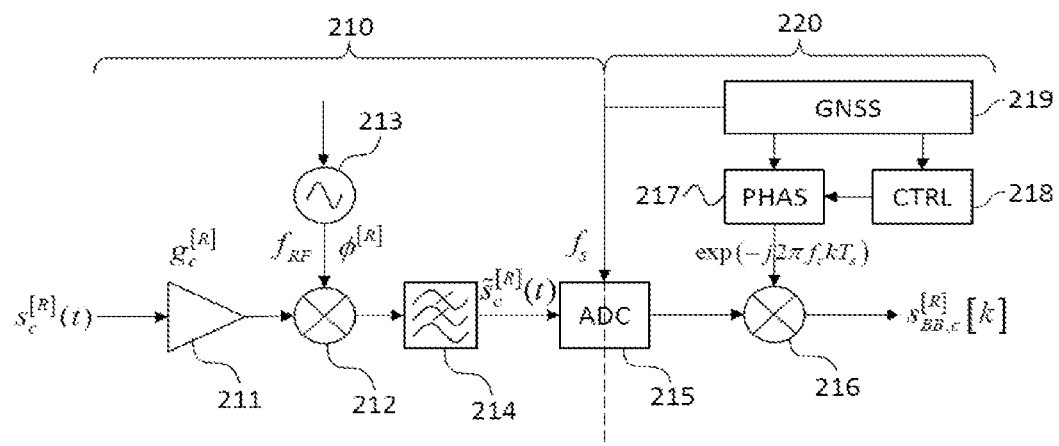
FIG. 2 schematically represents the architecture of a receiver in a base station of an LPWA network participating in the implementation of the invention.

The signal transmitted by the connected object is received by the receiver of a base station whose architecture has been schematically represented in FIG. 2.

The receiver comprises a first stage, 210, known as the RF stage, providing translation of the RF signal received at an intermediate frequency, and a second stage, 220, known as the IF stage, provides translation to baseband.

The RF stage operates in analogue mode. It comprises a low noise amplifier, 211, an RF mixer, 212, receiving a clock at the nominal frequency $f_{RF}$ generated by an RF oscillator, 213. In reality, the frequency of the RF oscillator is shifted by one offset $f_{RF}(1+\delta_f^{[R]})$, as will be seen later. The output signal from the mixer is then filtered by a low-pass filter, 214, before being sampled and converted to digital by the analogue-to-digital converter, 215. The analogue-digital converter samples the signal at a sampling rate $f_s=1/T_s$ obtained from a general synchronisation clock. This clock enables the base stations to be synchronised with each other, typically with an accuracy in the order of 10 to 30 ns in root mean square.

According to one advantageous characteristic of the invention, the IF stage operates in digital mode. The IF samples at the output of the ADC 215 are translated into baseband by means of a complex multiplier, 216, receiving from a digital generator, 217, phasors in digital form. Specifically, these phasors, which represent complex values $\exp(-j2\pi f_c kT_s)$ operating at the channel frequency $f_c$, are provided to the complex multiplier, at the rate $f_s$. The digital generator 217 is controlled by a channel controller 218. On command from the controller 218, the digital generator 217 can vary the frequency $f_c$ by reading corresponding phasors from a memory (not shown). The digital generator is synchronised with the general synchronisation clock.

Advantageously, the overall synchronisation clock may be obtained by virtue of a GNSS (Global Navigation Satellite System) receiver module, for example a GPS receiver code acquisition module. Alternatively, the general synchronisation clock can be provided by the backhaul network of a 5G network or fibre optic links between base stations. Alternatively, synchronisation can be obtained via the Internet using the Network Time Protocol (NTP) from a time server. Other types of synchronisation with the aforementioned precision may be contemplated.

When received by the base station, the RF signal is in the following form, in which the additive noise component has been omitted:

$$s_c^{[R]}(t)=s_c^{[T]}(t)*h^{[T,R]}(t,\tau) \quad (5)$$

where $h^{[T,R]}(t,\tau)$ is the channel impulse response at instant t between the connected object and the base station under consideration and * is the convolution product. For simplicity of presentation and without loss of generality, it is assumed that this channel is time invariant. In practice, it will suffice if the channel is invariant for the time of the measurement, that is essentially for the duration of the virtual band scan. Furthermore, since the baseband signal is narrowband, the channel can be modelled, for each band around $F_c^{[T]}$ by a simple complex coefficient, that is $A_c^{[T,R]}$. The received signal can then be written as:

$$s_c^{[R]}(t) = A_c^{[T,R]}s_c^{[T]}(t - \tau_0^{[T,R]}) \quad (6\text{-}1)$$

with $$A_c^{[T,R]} = \alpha_c^{[T,R]}\exp(j\varphi_c^{[T,R]}) = \sum_{p=0}^{P-1} a_p^{[T,R]}\exp(-j2\pi F_c^{[T]}(\tau_p^{[T,R]} - \tau_0^{[T,R]})) \quad (6\text{-}2)$$

where $a_p^{[T,R]}$ and $\tau_p^{[T,R]}$ are respectively the attenuation coefficients and delays of the different propagation paths, $\tau_0^{[T,R]}=d^{[T,R]}/c_l$ being the propagation time on the direct line of sight (LOS) path where $d^{[T,R]}$ is the distance between the connected object and the base station.

The received RF signal is frequency translated by mixing with the frequency $f_{RF}^{[R]}=(1+\delta_f^{[R]})f_{RF}$ where $\delta_f^{[R]}$ is the relative frequency offset between the transmitter and receiver. The signal at the intermediate frequency before analogue to digital conversion can be represented in complex notation by:

$$\tilde{s}_c^{[R]}(t)=g_c^{[R]}s_c^{[R]}(t) \exp(-j(2\pi f_{RF}^{[R]}t+\phi^{[R]})) \quad (7)$$

where $g_c^{[R]}$ is the receiver gain at the frequency $F_c^{[T]}$ and $\phi^{[R]}$ is the phase at the origin of the RF oscillator.

After sampling at the frequency $f_s=1/T_s$, the samples of the signal at the $$\frac{kT_s - t_0^{[R]}}{1 + \delta_f^{[R]}}$$

intermediate frequency are those taken at the times measured with respect to the reference clock, that is:

$$\hat{s}_k^{[R]}(kT_s) = \tilde{s}_c^{[R]}\left(\frac{kT_s - t_0^{[R]}}{1 + \delta_f^{[R]}}\right) \quad (8)$$

as the receiver clock is not synchronised with the reference clock. The time relative to the local clock varies as $t^{[R]}=(1+\delta_f^{[R]})t+t_0^{[R]}$ where $t_0^{[R]}$ is a time offset and $\delta_f^{[R]}$ is the relative frequency offset introduced earlier.

These samples are then translated into baseband by multiplication with the digital phasors at the frequency of the channel under consideration:

$$s_{BB,c}[R][k]=\hat{s}_k^{[R]}(kT_s) \cdot \exp(-j2\pi f_c kT_s)+n_c^{[T,R]}[k] \quad (9)$$

where $\exp(-j2\pi f_c kT_s)$, k=0, . . . , K−1, are the phasors in question and $n_c^{[T,R]}[k]$ are noise samples.

Combining expressions (2) to (4) and (6-1) to (9) gives the received signal samples as a function of the baseband transmitted signal samples, that is:

$$s_{BB,c}^{[R]}[k] = \quad (10)$$

-continued $$g^{[R]}g^{[T]}\alpha_c^{[T,R]} \cdot \left\{ \sum_{k=0}^{K-1} \Pi_{T_s}(\delta^{[T,R]}(kT_s - t_A^{[T,R]}) - \kappa T_s)s[k] \right\} \cdot \exp$$

$$j(\phi_c^{[T,R]}[k]) + n_v^{[T,R]}[k] \quad \quad 5$$

with $\phi c^{[T,R]}[k]=2\pi\delta_f^{[T,R]}(f_{RF}+f_c)kT_s+\phi_{A,c}^{[T,R]}[k]$.

The different terms appearing in expression (10) can be interpreted as follows:

$g_c^{[R]}$, $g_c^{[T]}$ are the respective complex gains of the receiver and transmitter at frequency $F_c$. These gains generally vary with frequency and are estimated and compensated for in a prior calibration phase.

$\alpha_c^{[T,R]}$ is the modulus of the complex coefficient of the transmission channel at the frequency $F_c$, its expression is given by:

$$\alpha_c^{[T,R]} = \quad \quad (11)$$
$$|A_c^{[T,R]}| = \left| \sum_{p=0}^{P-1} a_p^{[T,R]} \exp(-j2\pi(((1+\delta_f^{[T]})f_{RF} + f_c)(\tau_p^{[T,R]} - \tau_0^{[T,R]}))) \right|$$

The attenuation coefficient $\alpha_c^{[T,R]}$ is constant within each frequency channel (flat fading) but varies from channel to channel due to multiple paths of the transmission channel.

$$\delta^{[T,R]} = \frac{1+\delta_f^{[T]}}{1+\delta_f^{[R]}}$$

is a time dilation factor between the transmitter and the receiver.

It reflects the shift in conversion (DAC) and sampling (ADC) times between the transmitter and receiver.

$$t_A^{[T,R]} = (1+\delta_f^{[R]})\tau_0^{[T,R]} + \frac{1+\delta_f^{[R]}}{1+\delta_f^{[T]}}(t_D^{[T]} - t_0^{[T]}) + t_0^{[R]}$$

is the time of arrival of the packet in the receiver time base. The first term corresponds to the propagation time (affected by the drift of the receiver local clock with respect to the reference clock), the second term corresponds to the time of transmission of the packet (affected by the respective drifts of the transmitter and receiver clocks), and the last term corresponds to the time offset of the transmitter.

$$\delta_f^{[T,R]} = \frac{\delta_f^{[T]} - \delta_f^{[R]}}{1+\delta_f^{[R]}}$$

reflects the relative clock frequency offset between the transmitter and the receiver.

$\phi_{A,c}^{[T,R]}$ is the phase of arrival of the first sample of the packet (k=0) arriving at the base station receiver:

$$\phi_{A,c}^{[T,R]} = -2\pi(1+\delta_f^{[T]})(f_{RF}+f_c)\tau_0^{[T,R]} + \varphi_c^{[T,R]} \quad \quad (12)$$
$$+2\pi f_c t_0^{[T]} - 2\pi\left(\frac{(\delta_f^{[T]} - \delta_f^{[R]})f_{RF} + (1+\delta_f^{[T]})f_c}{1+\delta_f^{[R]}}\right)t_0^{[R]}$$
$$+\phi_c^{[T]} - \phi^{[R]}$$

and finally $n_c^{[T,R]}[k]$ is an assumed additive white Gaussian noise (AWGN) sample.

The phase of arrival of the signal, that is the phase of a baseband signal sample as it arrives at the receiver, is given by $\phi_c^{[T,R]}[k]=(2\pi\delta_f^{[T,R]}(f_{RF}+f_c)kT_s+\phi_{A,c}^{[T,R]}[k])$, as can be seen in equation (10).

Given expression (12), this phase of arrival is expressed as follows:

$$\phi_c^{[T,R]}[k] = 2\pi\delta_f^{[T,R]}(f_{RF}+f_c)kT_s \quad \quad (13)$$
$$-2\pi(1+\delta_f^{[T]})(f_{RF}+f_c)\tau_0^{[T,R]} + \varphi_c^{[T,R]}$$
$$+2\pi f_c t_0^{[T]} - 2\pi\left(\frac{(\delta_f^{[T]} - \delta_f^{[R]})f_{RF} + (1+\delta_f^{[T]})f_c}{1+\delta_f^{[R]}}\right)t_0^{[R]}$$
$$+\phi_c^{[T]} - \phi^{[R]}$$

Without loss of generality, the clock of the connected object can be arbitrarily taken as the reference clock, that is $t_0^{[T]}=0$, $\delta_f^{[T]}=0$ and $$\delta_f^{[T,R]} = \frac{-\delta_f^{[R]}}{1+\delta_f^{[R]}}.$$

This reference is advantageous in that it lends itself well to the expression of the phases of arrival of the base stations used to locate the object. The phase of arrival of the signal is then expressed in a simpler way:

$$\phi_c^{[T,R]}[k] = -2\pi\frac{\delta_f^{[R]}}{1+\delta_f^{[R]}}(f_{RF}+f_c)kT_s \quad \quad (14)$$
$$-2\pi(f_{RF}+f_c)\tau_0^{[T,R]} + \varphi_c^{[T,R]}$$
$$-2\pi\left(\frac{f_c - \delta_f^{[R]}f_{RF}}{1+\delta_f^{[R]}}\right)t_0^{[R]}$$
$$+\phi_c^{[T]} - \phi^{[R]}$$

When the signal transmitted by the connected node is received by a plurality of base stations, the difference in phase of arrival of the signal received by the base station $BS_i$ (equipped with the receiver $R_i$) and the base station $BS_l$ (equipped with the receiver $R_l$) enables the (unknown) phase $\phi_c^{[T]}$ of the RF signal to be removed from the transmitter:

$$\Delta\phi_c^{[R_i,R_\ell]}[k] = \phi_c^{[T,R_i]}[k] - \phi_c^{[T,R_\ell]}[k] = -2\pi\left(\frac{\delta_f^{[R_i]}}{1+\delta_f^{[R_i]}} - \frac{\delta_f^{[R_\ell]}}{1+\delta_f^{[R_\ell]}}\right)(f_{RF}+f_c)kT_s \quad \quad (16)$$

-continued
$$-2\pi(f_{RF}+f_c)(\tau_0^{[T,R_i]}-\tau_0^{[T,R_\ell]})+(\varphi_c^{[T,R_i]}-\varphi_c^{[T,R_\ell]})$$
$$+2\pi f_{RF}\left(\frac{\delta_f^{[R_i]}t_0^{[R_i]}}{1+\delta_f^{[R_i]}}-\frac{\delta_f^{[R_\ell]}t_0^{[R_\ell]}}{1+\delta_f^{[R_\ell]}}\right)$$
$$-2\pi f_c\left(\frac{t_0^{[R_i]}}{1+\delta_f^{[R_i]}}-\frac{t_0^{[R_\ell]}}{1+\delta_f^{[R_\ell]}}\right)$$
$$-(\phi^{[R_i]}-\phi^{[R_\ell]})$$

The fact that the time difference of arrival no longer depends on the phase of the transmitter RF signal is essential, as it allows the constraints on the transmitter hardware architecture, in particular on the stability of its RF oscillator, to be completely dispensed with.

The phase difference of arrival between the two base stations comprises several terms. The first term corresponds to the phase shift over time due to the relative offset of the sampling frequencies in the receivers of the two base stations. The second term carries the useful information of the difference in signal propagation time. The third term reflects a synchronisation error of the RF stages of the two receivers and the fourth term as a relative synchronisation error of the IF stages. These synchronisation errors are due to the time offsets between the sampling frequencies of the base stations. Finally, the last term is the phase difference at the origin between the RF oscillators of the two receivers.

A key point to note is that, since the baseband translation is performed digitally by phasors, no origin phase variation is introduced in the IF oscillator and therefore the last term remains constant during the virtual band frequency scan. This feature especially avoids the need for a reference node having a known position, as required in prior art.

The locating principle by phase difference of arrival is based on the ability to extract the propagation delay difference $\tau_0^{[T,R_i]}-\tau_0^{[T,R_\ell]}$ (in LOS) from the slope of $\Delta\phi_c^{[R_i,R_\ell]}[k]$, as a function of the channel frequency J. The first and fourth terms of $\Delta\phi_c^{[R_i,R_\ell]}[k]$, are spurious terms that are also linearly dependent on frequency $f_c$ and have therefore be removed.

In practice, the phase shift $\Delta\phi_c^{[R_i,R_\ell]}[k]$, is not calculated on each sample, but on each packet, an estimate of phase of arrival averaged over the packet, called the packet phase of arrival, for each base station, that is $\phi_c^{[T,R_i]}$, $\phi_c^{[T,R_\ell]}$. This packet phase of arrival is obtained by correlating a packet of K samples with a pilot sequence (or with an error-free decoded sequence). A packet phase difference of arrival $\Delta\phi_c^{[R_i,R_\ell]}=\phi_c^{[T,R_i]}-\phi_c^{[T,R_\ell]}$ is derived for each channel.

Figure 3:
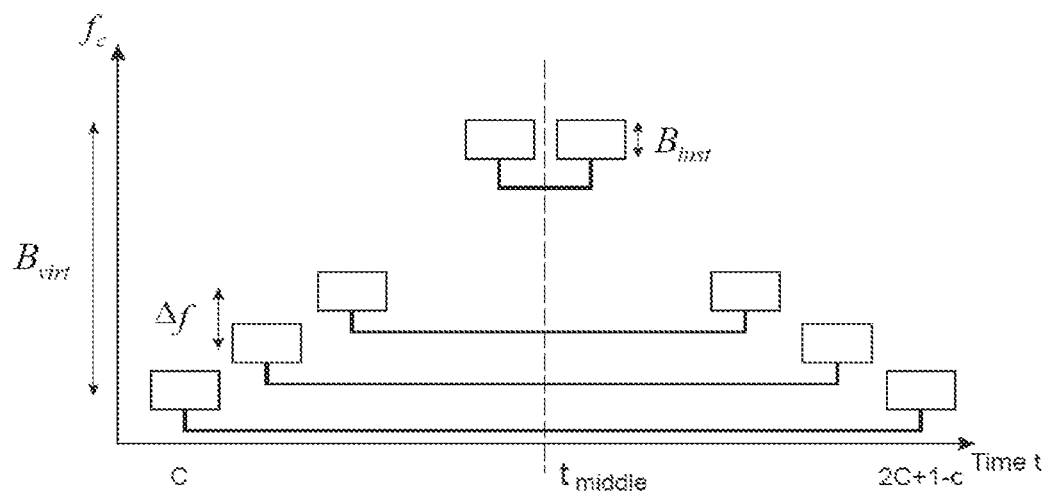
FIG. 3 schematically represents a virtual band scan that can be used in the locating method according to one embodiment of the invention.

The first term in (16) can be minimised by adopting the virtual band frequency scanning scheme disclosed in application DE-A-10 2007 043 649 and illustrated in FIG. 3. However, constraints inherent in this scanning scheme can be relaxed as explained below.

The channel frequency has been represented on the ordinate and the time on the abscissa. The virtual band $B_{virt}=(C-1)\Delta f$ around the carrier is scanned in $\Delta f$ hops, with a first scan in the uplink direction and a second scan, temporally symmetrical to the first one, being performed in the downlink direction. More specifically, the intermediate frequency varies in $+\Delta f$ hops, so as to successively scan the channels C in the uplink direction on the first scan and then varied in $-\Delta f$ hops so as to successively scan the subsequent channels C in the downlink direction on the second scan. It should be noted that the order of the scanning directions is irrelevant. The transmitter transmits one sample packet K at each frequency hop, that is the transmission period of time in each channel is $KT_s$. Assuming that the intermediate frequency change is instantaneous, the total scan period of time is $2CKT_s$.

The removal of the first term can be achieved by summing the packet phase differences of arrival, $\Delta\phi_c^{[R_i,R_\ell]}$ and $\Delta\phi_{2C+1-c}^{[R_i,R_\ell]}$ obtained for the same channel during the uplink scan and downlink scan, the sum of the first terms of (16) then giving the phase error:

$$-4\pi\left(\frac{\delta_f^{[R_i]}}{1+\delta_f^{[R_i]}}-\frac{\delta_f^{[R_\ell]}}{1+\delta_f^{[R_\ell]}}\right)(f_{RF}+f_c)CKT_s \quad (17)$$

It is observed that the factor of $(f_{RF}+f_c)$ no longer depends on the packet rank. This observation is still true when programming of the channel change is not instantaneous but lasts for a time $\theta$, the period of time $CKT_s$ being simply increased by $2(C-1)\theta$.

Since this error component is a simple constant $$-4\pi\left(\frac{\delta_f^{[R_i]}}{1+\delta_f^{[R_i]}}-\frac{\delta_f^{[R_\ell]}}{1+\delta_f^{[R_\ell]}}\right)f_{RF}\cdot CKT_s,$$

it is not taken into account in the extraction of the time difference of arrival.

The phase error component due to the difference between the synchronisation error of the IF stages linearly depends on $f_c$. However, since $F_c\square f_{RF}$, the phase rotation due to $$\left(\frac{\delta_f^{[R_i]}}{1+\delta_f^{[R_i]}}-\frac{\delta_f^{[R_\ell]}}{1+\delta_f^{[R_\ell]}}\right)f_c$$

is relatively small. The sample rate offset of each receiver can be estimated in a conventional way by observing the phase time course of the received signal over several samples within the same channel. The frequency offsets thus estimated for the base station receivers $BS_i$ et $BS_j$ will be noted $\hat{\delta}_f^{[R_i]}$ and $\hat{\delta}_f^{[R_j]}$.

Once the period of time $KT_s$ of a packet and, if necessary that, $\theta$, separating two successive packets are known, the phase error (17) can be estimated.

In summary, if the scanning described above is performed and the packet phase differences of arrival are summed for channels of the same frequency $f_{2C+1-c}=f_c$, there is obtained, after removing the phase error introduced by the difference in the previously estimated frequency offsets:

$$\phi_c^{[R_i,R_\ell]} + \phi_{2C+1-c}^{[R_i,R_\ell]} - \left[-4\pi\left(\frac{\hat{\delta}_f^{[R_i]}}{1+\hat{\delta}_f^{[R_i]}} - \frac{\hat{\delta}_f^{[R_\ell]}}{1+\hat{\delta}_f^{[R_\ell]}}\right)f_c CKT_s\right] =$$

$$-4\pi(f_{RF} + f_c)\left(\tau_0^{[T,R_i]} - \tau_0^{[T,R_\ell]}\right) + \left(\varphi_c^{[T,R_i]} - \varphi_c^{[T,R_\ell]}\right)$$

$$-4\pi f_c\left(\frac{t_0^{[R_i]}}{1+\delta_f^{[R_i]}} - \frac{t_0^{[R_\ell]}}{1+\delta_f^{[R_\ell]}}\right) + \Phi$$

(18)

where $\Phi$ is a constant phase.

The sum of the packet phase differences for two symmetrical channels c and 2C+1−c is noted as $\Phi_c^{[R_i,R_\ell]} = \phi_c^{[R_i,R_\ell]} + \phi_{2C+1-c}^{[R_i,R_\ell]}$ in the following.

It is important to note that the constraints on the frequency scan order and scan uniformity can be relaxed. Indeed, it is understood that any permutation (along the ordinate axis) of the frequencies $f_c$ associated with the channel pairs c, 2C+1−c in FIG. 3, can be performed while preserving the temporal symmetry, and thus the property expressed in (18). Moreover, it is not necessary to provide scan of the virtual band with a constant frequency hopping Δf, since the phase error given by (17) can be corrected only by the knowledge of the frequency offsets of the base stations and the value of the channel frequency $f_c$ considered.

Knowing the transmitted sequence (for example a pilot sequence), each base station receiver can determine the modulus of the transfer function of the transmission channel after baseband translation, in each frequency channel. Indeed, according to expression (10), the modulus $\alpha_c^{[T,R]}$ of the complex coefficient $A_c^{[T,R]}$ of the transfer function at the frequency $f_c$ can be simply obtained by taking the modulus of the correlation of the sequence $s_{BB,c}^{[R]}[k]$, k=0, ..., K−1 with the pilot sequence.

This gives the moduli $\alpha_c^{[T,R_i]} = \alpha_{2C+1-c}^{[T,R_i]}$ for the base station $BS_i$ and $\alpha_c^{[T,R_\ell]} = \alpha_{2C+1-c}^{[T,R_\ell]}$ for the base station $BS_\ell$.

The entity in charge of calculation then constructs a composite baseband transfer function:

$$\tilde{H}_c^{[R_i,R_\ell]}\alpha_c^{[T,R_i]} = \alpha_{2C+1-c}^{[T,R_i]}\alpha_c^{[T,R_\ell]} = \alpha_{2C+1-c}^{[T,R_\ell]} \exp(j\Phi_c^{[R_i,R_\ell]}, c=1, \ldots, C$$
(19)

This transfer function is none other than the product of two transfer functions corresponding to the transmission channels between the connected object and the two base stations respectively:

$$\tilde{H}_c^{[R_i,R_\ell]} = (H_c^{[T,R_i]})^2((H_c^{[T,R_\ell]})^2)^*$$ (20-1)

where $(H_c^{[T,R_i]})^2 = \alpha_c^{[T,R_i]}\alpha_{2C+1-c}^{[T,R_i]}$ exp $j(\varphi_c^{[T,R_i]} + \varphi_{2C+1-c}^{[T,R_i]})$, et $(H_c^{[T,R_\ell]})^2 = \alpha_c^{[T,R_\ell]}\alpha_{2C+1-c}^{[T,R_\ell]}$ exp $j(\varphi_c^{[T,R_\ell]} + \varphi_{2C+1-c}^{[T,R_\ell]})$, (20-2)

The transfer function $(H_c^{[T,R_i]})^2$, c=1, ..., C is none other than the Fourier transform of the baseband impulse response, $h^{[T,R_i]}$, of the channel between the connected object and the base station, convolved with itself:

$$\{(H_c^{[T,R_i]})^2|c=1,\ldots,C\} = DFT(h^{[T,R_i]}(t)*h^{[T,R_i]}(t))$$ (21-1)

Likewise:

$$\{(H_c^{[T,R_\ell]})^2|c=1,\ldots,C\} = DFT(h^{[T,R_\ell]}(t)*h^{[T,R_\ell]}(t))$$ (21-2)

The composite transfer function $\tilde{H}_c^{[R_i,R_\ell]}$ corresponds to a baseband impulse response:

$$\tilde{h}_c^{[R_i,R_\ell]}(t) = IDFT\{\tilde{H}_c^{[R_i,R_\ell]}|c=1,\ldots,C\} = (h^{[T,R_i]}(t)*h^{[T,R_i]}(t)) \otimes (h^{[T,R_\ell]}(t)*h^{[T,R_\ell]}(t))$$ (22)

where $\otimes$ is the correlation operator.

By virtue of its time reversal, convolution corrects the phase errors due to the frequency offsets of the RF oscillators in the two base stations. As for correlation, on the other hand, it enables the time of transmission of the waveform to be dispensed with.

The peak of highest amplitude in the impulse response $\tilde{h}^{[R_i,R_\ell]}0$ allows the difference in propagation time in line of sight between the connected object and the two base stations to be estimated:

$$\tau_0^{[T,R_i]} - \tau_0^{[T,R_\ell]} = \frac{1}{2}\arg\max_t(|\tilde{h}^{[R_i,R_\ell]}(t)|)$$ (23)

and, therefore, the distance difference $\Delta d_{i\ell}$, between the connected object and the two base stations $BS_i$, $BS_\ell$ is finally given by:

$$\Delta d_{i\ell} = c_{light}(\tau_0^{[T,R_i]} - \tau_0^{[T,R_\ell]}) = \frac{c_{light}}{2}\arg\max_t(|\tilde{h}^{[R_i,R_\ell]}(t)|)$$ (24)

From the distance differences $\Delta d_{i\ell}$, and the positions of the base stations, the entity in charge of calculation can estimate by hyperbolic trilateration, the position of the connected object, in a way known per se.

The entity in charge of calculation can be a remote server or one of the base stations participating in locating, which then plays the role of reference base station.

Figure 4:
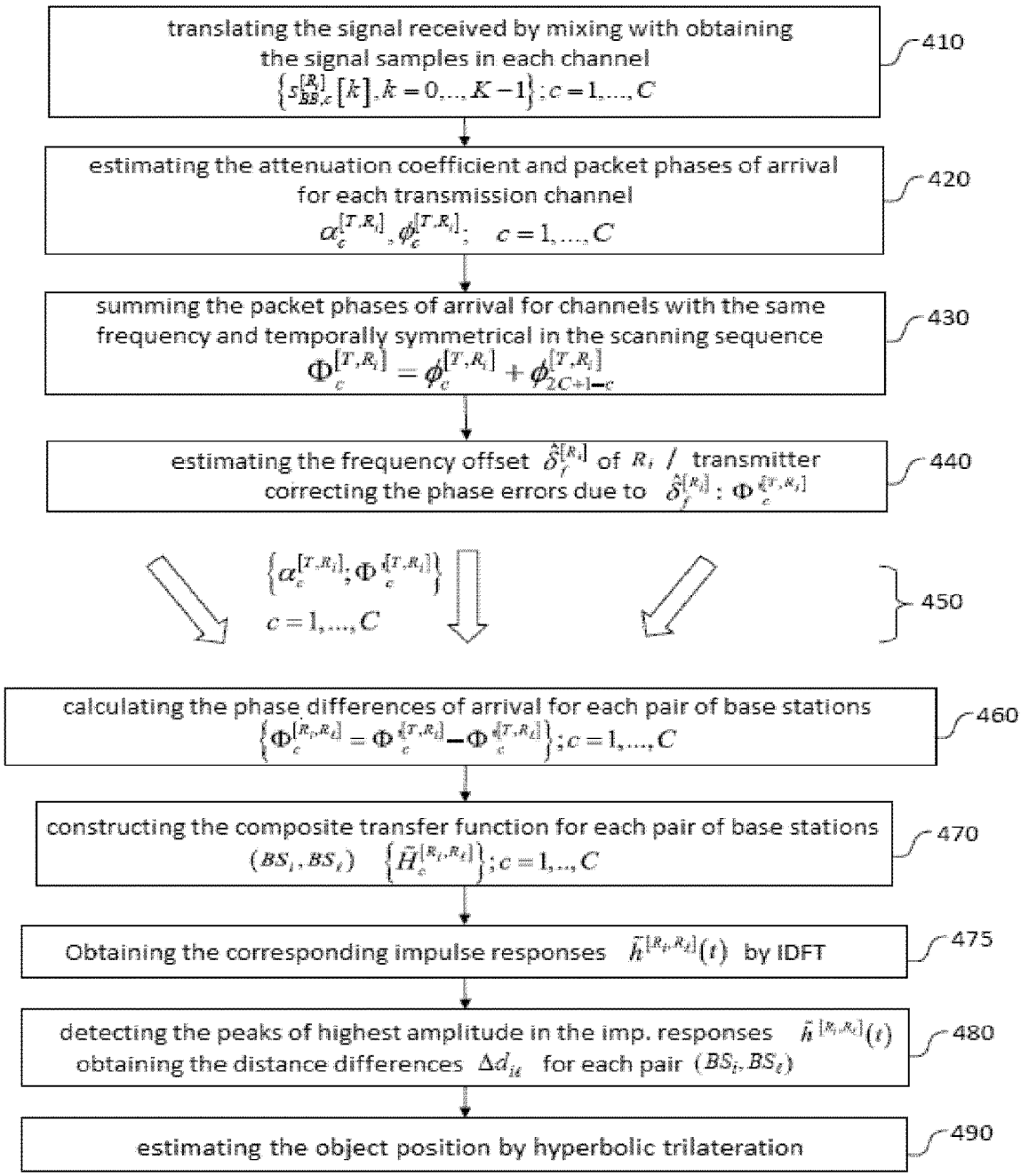
FIG. 4 represents the flowchart of a method for locating a connected object in an LPWA network according to a first embodiment of the present invention.

FIG. 4 represents the flowchart of a method for locating a connected object in an LPWA network according to a first embodiment of the present invention.

For the sake of simplicity, only the steps performed by a base station $BS_i$ have been represented here. However, the skilled person will understand that similar steps are performed by the other base stations participating in locating. As a general rule, locating a connected object requires a plurality (at least 3 in the case of a two-dimensional locating) of base stations. The set of base stations participating in locating will be noted Ω.

It is assumed that the object successively transmits signals (waveforms) at frequencies $f_{RF}+f_c$, during packets (of duration $KT_s$), each packet corresponding to a transmission in a frequency channel $f_c$. The channel frequency scans a predetermined virtual band a first time in a first channel sequence and a second time in a second channel sequence, the first and second channel sequences being temporally symmetrical to each other, with respect to an instant, $t_{middle}$ (see FIG. 3) corresponding to half of the full scan consisting of the first sequence followed by the second sequence. For example, the first channel sequence is obtained by scanning in the uplink direction and the second channel sequence is obtained by scanning in the downlink direction. Advantageously, the uplink and downlink scans are performed uniformly with a constant frequency hopping, Δf.

Steps 410-450 are performed in parallel by the base stations, and then steps 460-490 are performed by the calculation server, based on the information transmitted by the latter. However, some of the steps 420-440 entrusted to the base stations may be attributed to the server, provided that the necessary information is transmitted to it.

In step 410, the base station receiver $BS_i$ translates the received signal by mixing with the RF carrier frequency to obtain a channel signal at an intermediate frequency, and then baseband translates the channel signal, this baseband translation being performed digitally by multiplication with phasors as described above.

In step 420, the receiver estimates, by means of a correlation with a pilot sequence (or with a sequence of symbols received without error), the attenuation coefficient, $\alpha_c^{[T,R_i]}$, of the transmission channel, as well as the packet phase of arrival, $\Phi_c^{[T,R_i]}$, at the frequencies $f_{RF}+f_c$ where $f_c$, $c=1, \ldots, C$ are the frequencies of the different channels.

In step 430, the receiver performs the sum of the packet phases of arrival for each pair of symmetrical channels, that is the sum relates to packets at the same channel frequency but at opposite virtual band scanning directions. This gives an averaged phase of arrival for each channel $\Phi_c^{[T,R_i]}$.

If necessary, the scanning order of the different channel frequencies may be swapped and the hops between successive channel frequencies may not be constant.

In step 440, the receiver $BS_i$ makes an estimate of the frequency offset $\hat{\delta}_f^{[R_i]}$ of its clock with respect to that of the transmitter and corrects the phase arrival $\Phi_c^{[T,R_i]}$ of the phase error by adding $$4\pi \left( \frac{\hat{\delta}_f^{[R_i]}}{1+\hat{\delta}_f^{[R_i]}} \right) f_c CKT_s$$

to it, for each of the frequency channels $c=1, \ldots, C$:

$$\Phi_c'^{[T,R_i]} = \Phi_c^{[T,R_i]} + 4\pi \left( \frac{\hat{\delta}_f^{[R_i]}}{1+\hat{\delta}_f^{[R_i]}} \right) f_c CKT_s.$$

In step 450, the base station $BS_i$ transmits the values $\{\alpha_c^{[T,R_i]}; \Phi_c'^{[T,R_i]}\}$, $c=1, \ldots, C$ to the calculation server.

In step 460, the server calculates the phase differences of arrival for each pair of the set of base stations, that is for the base stations $BS_i$ and $BS_j \Phi_c^{[R_i,R_j]} = \Phi_c'^{[T,R_i]} - \Phi_c'^{[T,R_j]}$, for each channel $c=1, \ldots, C$.

In step 470, the server constructs the composite baseband transfer functions $\tilde{H}_c^{[R_i,R_j]}=\{\tilde{H}_c^{[R_i,R_j]}; c=1, \ldots, C\}$ for each pair of base stations $BS_i$, $BS_j$ of $\Omega$, by means of expression (19).

In step 475, the server performs an inverse Fourier transform (IDFT) of each of the composite transfer functions constructed in the previous step, to generate the corresponding composite impulse responses, $\tilde{h}^{[R_i,R_j]}(t)$ for each pair of base stations $BS_i$, $BS_j$ of $\Omega$.

When the order of the scanned frequencies has been swapped in any way from that of a linear uplink or downlink scan, the order of the composite transfer functions $\tilde{H}_c^{[R_i,R_j]}=\{\tilde{H}_c^{[R_i,R_j]}; c=1, \ldots, C\}$ is swapped in the opposite direction before the inverse Fourier transform is applied. Finally, when the virtual band scan is non-uniform a non-uniform inverse Fourier transform (NU-IDFT) is applied to the composite transfer functions, using the actually scanned frequencies.

In step 480, the server detects the peak of highest amplitude in each impulse response $\tilde{h}_c^{[R_i,R_j]}$ and derives, from the expression (23), the line of sight propagation time difference between the connected object and the base stations $BS_i$, $BS_j$ of $\Omega$. This detection is repeated for each impulse response $\tilde{h}_c^{[R_i,R_j]}$. The server derives the distance differences, $\Delta d_{ij}$, between the connected object and the base stations $BS_i$, $BS_j$, for each pair of base stations $BS_i$, $BS_j$ of $\Omega$.

In step 490, the server estimates the position of the connected object by hyperbolic trilateration from the distance differences $\Delta d_{ij}$ estimated in the previous step.

Figure 5:
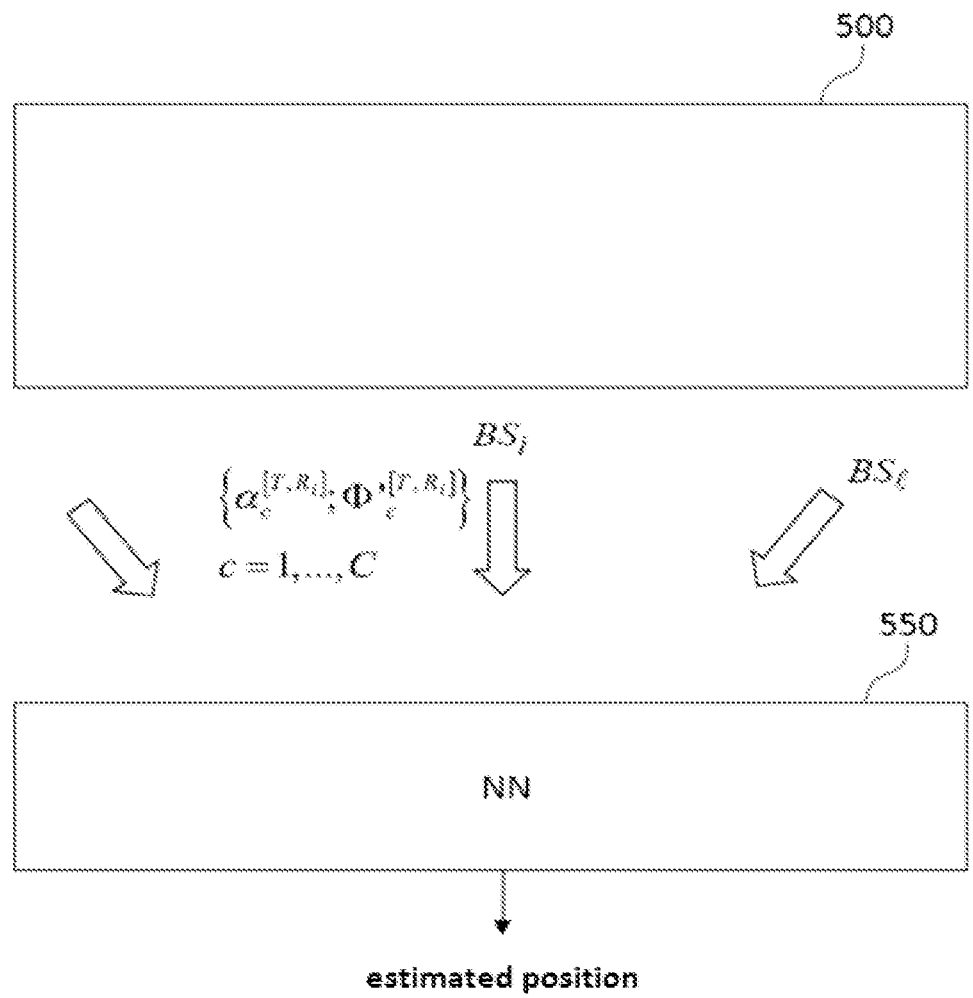
FIG. 5 schematically represents a method for locating a connected object according to a second embodiment of the invention.

FIG. 5 schematically represents a method for locating a connected object according to a second embodiment of the invention.

In this second embodiment, the steps performed by the base stations, collectively designated by the block 500, are identical to those already described in relation to FIG. 4.

However, the calculation server does not perform either explicit calculation of the phase differences of arrival or explicit construction of the baseband composite transfer function.

The estimation of the position of the connected object is obtained here by a neural network, 550, whose input layer receives the values $\{\alpha_c^{[T,R_i]}; \Phi_c'^{[T,R_i]}\}$, $c=1, \ldots, C$, of each base station $BS_i$ of the set $\Omega$, and whose output layer receives the coordinates of the object.

The neural network is previously trained on labelled data, that is on sets of such values associated with known positions. This labelled data can be the result of a real measurement run (for example by means of a geo-referenced connected object) or it can be the result of a simulation. During the training phase, the set of synaptic coefficients is updated from the labelled data, using the stochastic gradient algorithm.

According to an alternative of the second embodiment, the neural network does not directly provide the position of the object but simply the differences in propagation time $\tau_0^{[T,R_i]}-\tau_0^{[T,R_j]}$ or, equivalently, the distance differences $\Delta d_{ij}$ for the different pairs of base stations of $\Omega$. A hyperbolic trilateration algorithm is then used to estimate the position of the connected object, as in the first embodiment.

Those skilled in the art will understand that, regardless of the embodiment, locating the connected object here only requires sending two packets (per frequency channel) to the base stations and no geolocated reference node is required.

Figure 6:
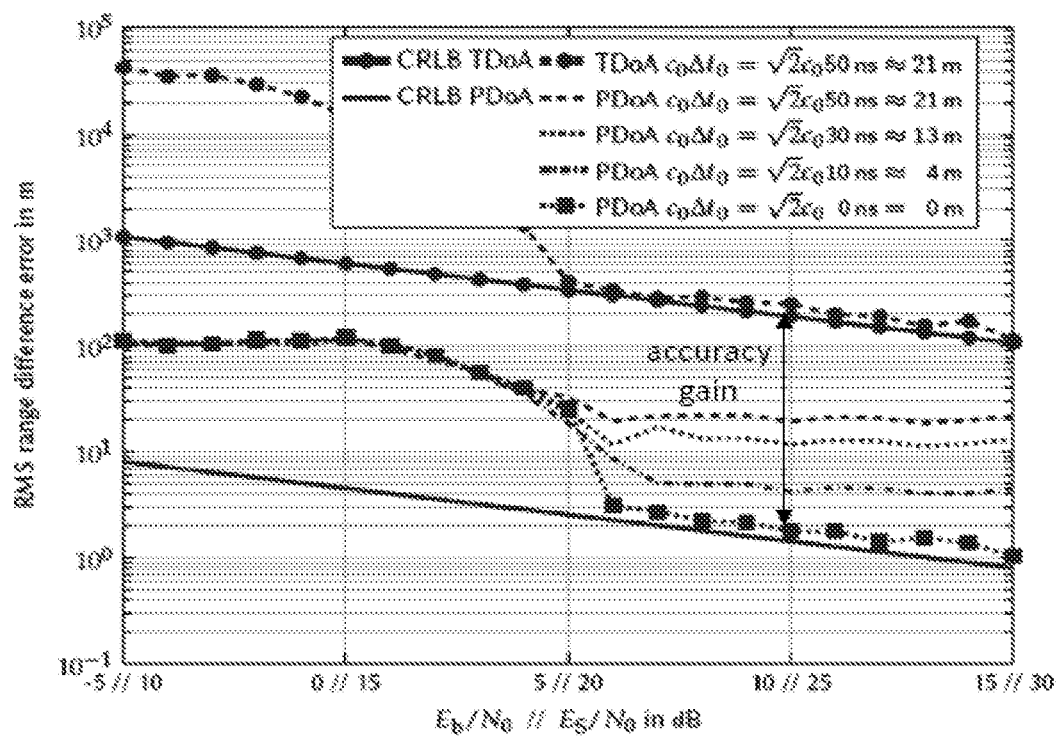
FIG. 6 illustrates in an example the performance of a method for locating a connected object according to the invention in comparison with that of a locating method known from the state of the art.

FIG. 6 allows the comparison on one example of the root mean square error of the estimated position as a function of the signal-to-noise ratio, for a locating method according to the present invention and a locating method using time differences of arrival, known from the state of the art.

The signal transmitted by the connected object of the LPWA network is a 10 kchips/s BPSK signal ($B_{inst}=10$ kHz) modulating a 32 chip-length Gold sequence. This sequence is repeated on C=16 frequency channels scanned according to the symmetrical scan pattern illustrated in FIG. 3. The frequency channels are spaced with a frequency hopping of 200 kHz, resulting in a virtual bandwidth $B_{virt}$ of 3 MHz. Only two base stations were taken into account, the position error being measured here with respect to the hyperbola passing through the point where the object is actually situated. It was assumed that the base stations and the connected object were assigned a carrier frequency offset (CFO) in the order of $\pm 2 \cdot 10^{-6}$.

For a signal-to-noise ratio $E_s/N_0$ of 25 dB, the root mean square error of the position of the connected object, obtained by means of a trilateration method based on Time Differences of Arrival (TDoA), is 300 m, whereas it is only 2 m by means of the Phase Difference of Arrival (PDoA) locating method according to the present invention.

FIG. 6 also shows the variation in the root mean square error of the position of the object as a function of the synchronisation standard deviation of the base station. For example, for a synchronisation standard deviation in the order of 30 ns (case of a GNSS clock), the root mean square error on the object position switches to 13 m which is still much lower than the error obtained by TDoA.

The invention claimed is:

1. A method for locating a connected object in an LPWA network using a plurality of base stations, the connected object transmitting an RF signal comprised of a sequence of packets in a plurality of frequency channels forming a virtual band, the virtual band being scanned a first time according to a first channel sequence and a second time according to a second channel sequence, the first and second channel sequences being temporally symmetrical to each other, wherein:
   (a) each base station performs translation of the RF signal at the channel frequency, sampling of the RF signal translated, and then baseband translation in digital mode by multiplication with phasors, the sampling being synchronous with a general clock, common to all the base stations;
   (b) each base station estimates the attenuation coefficient of the transmission channel between the connected object and itself, in baseband, as well as a phase of arrival of a packet, called a phase of arrival, for each frequency channel of the first sequence and of the second sequence of channels;
   (c) each base station sums the phases of arrival of packets relating to a same channel but to distinct sequences of channels to obtain an averaged phase of arrival for each channel),
   (d) each base station estimates the frequency offset ($\hat{\delta}^{[R_i]}_f$) between its sampling frequency and that of the transmitter, and then corrects the averaged phase of arrival for each channel by a phase error due to this frequency offset, so as to obtain an averaged and corrected phase of arrival ($\Phi'^{[T,R_i]}_c$);
   (e) each base station transmits to a server the previously estimated attenuation coefficients and averaged and corrected phases of arrival;
   (f) the server calculates, for each pair of base stations of said plurality, the averaged and corrected phase differences of arrival so as to obtain phase differences of arrival ($\{\Phi^{[R_i,R_j]}_c = \Phi'^{[T,R_i]}_c - \Phi'^{[T,R_j]}_c\}$), for each channel frequency;
   (g) the server constructs, for each pair ($BS_i$, $BS_j$) consisting of a first and a second base station, a composite transfer function ($\tilde{H}^{[R_i,R_j]}$) relating to these two base stations, from the attenuation coefficients of the transmission channel between the connected object and the first and second base stations respectively for the different frequency channels, as well as the phase differences of arrival obtained in the previous step for the said pair of base stations and for these same frequency channels;
   (h) the server performs an inverse Fourier transform of each composite transfer function obtained in the previous step so as to obtain a composite impulse response ($\tilde{h}^{[R_i,R_j]}(t)$) for each pair of base stations of said plurality;
   (i) the server detects the peak of highest amplitude in each of the composite impulse responses and derives therefrom, for each pair ($BS_i$,$BS_j$) consisting of a first and a second base station, a distance difference ($\Delta d_{ij}$) between the connected object and the first base station, on the one hand, and between the connected object and the second base station, on the other hand;
   (j) the server estimates the position of the connected object by hyperbolic trilateration from the distance differences obtained in previous step (i).

2. The method for locating a connected object according to claim 1, wherein the first channel sequence is obtained by scanning in the uplink direction and the second channel sequence is obtained by scanning in the downlink direction, the uplink and downlink scans being performed uniformly with a constant frequency hopping ($\Delta f$).

3. The method for locating a connected object according to claim 2, wherein in step (a), the baseband translation is performed by multiplying, at the rate of the sampling frequency, the samples of the translated RF signal, by phasors $\exp(-j2\pi f_c k T_x)$ where $f_c$ is the channel frequency, $f_x = 1/T_x$ is the sampling frequency of the receiver and k is the rank of the sample.

4. The method for locating a connected object according to claim 2, wherein in step (b) estimating the transmission channel coefficient and the phase of arrival of a sample packet is achieved by correlating the sequence of samples of the baseband signal with a pilot sequence, the modulus of the correlation result being comprised of the gains of the transmitter and the receiver to obtain said transmission channel coefficient.

5. The method for locating a connected object according to claim 2, wherein in step (c) the base station performs, for each frequency channel, the sum $\Phi^{[T,R_i]}_c = \phi^{[T,R_i]}_c + \phi^{[T,R_i]}_{2C+1-c}$, $\phi x^{[T,R_i]}$ being the phase of arrival of the packet c transmitted at the channel frequency $f_c$ in a first scanning direction and $\phi^{[T,R_i]}_{2C+1-c}$ is the phase of arrival of the packet $2C+1-c$ transmitted at the channel frequency in a second scanning direction opposite to the first one, K is the number of samples in a packet and C is the number of packets per scanning direction.

6. The method for locating a connected object according to claim 2, wherein in step (d) the averaged phase of arrival $\Phi^{[T,R_i]}_c$ is corrected by $$\Phi'^{[T,R_i]}_c = \Phi^{[T,R_i]}_c + 4\pi\left(\frac{\hat{\delta}^{[R_i]}_f}{1+\hat{\delta}^{[R_i]}_f}\right) f_c C K T_s$$

where $\delta^{[T,R_i]}_f$ is the frequency offset estimated in that same step, $f_c$ is the channel frequency, C is the number of packets per scan, K is the number of samples per packet and $f_s = 1/T_s$ is the sampling frequency.

7. The method for locating a connected object according to claim 2, wherein in step (g), for each pair of base stations consisting of a first base station $BS_i$ and a second base station $BS_j$, the server constructs the composite transfer function by $\tilde{H}^{[R_i,R_j]}_c = \alpha^{[T,R_i]}_c \alpha^{[T,R_i]}_{2C+1-c} \alpha^{[T,R_j]}_c \alpha^{[T,R_j]}_{2C+1-c} \exp(j\Phi^{[R_i,R_j]}_c)$ where $\alpha^{[T,R_i]}_c$, $\alpha^{[T,R_i]}_{2C+1-c}$ are the attenuation coefficients of the transmission channel between the connected object and the base station $BS_i$ at the channel frequency $f_c$, respectively in the first and second scan, where $\alpha^{[T,R_j]}_c$, $\alpha^{[T,R_j]}_{2C+1-c}$ are the attenuation coefficients of the transmission channel between the connected object and the base station $BS_j$ at the channel frequency $f_c$, respectively in the first and second scan, and where $\Phi^{[R_i,R_j]}_c$ is the phase difference of arrival obtained in step (f) for the pair of base stations base $BS_i$, $BS_j$ and for the channel frequency $f_c$.

8. The method for locating a connected object according to claim 2, wherein in step (i) the distance difference between the connected object and a first base station $BS_i$ on the one hand, and the connected object and a second base station $BS_l$ on the other hand, is obtained by $$\Delta d_{il'} = \frac{c_{light}}{2} \arg\max_t \left( \left| \tilde{h}^{[R_i,R_{l'}]}(t) \right| \right)$$

where $\tilde{h}^{[R_i,R_{l'}]}(t)$ is the composite impulse response obtained in step (h) for the pair of base stations $BS_i$, $BS_l$, and $c_{light}$ is the speed of light.

9. The method for locating a connected object according to claim 1, wherein the overall clock is given by a GNSS reception module equipping each of the base stations of said plurality.

10. The method for locating a connected object according to claim 1, wherein the overall clock is obtained via the Internet by means of the NTP protocol from a time server.

11. The method for locating a connected object according to claim 1, wherein the overall clock is obtained via a backhaul network of a 5G network.

12. A method for locating a connected object in an LPWA network using a plurality of base stations, the connected object transmitting an RF signal comprised of a sequence of packets in a plurality of frequency channels forming a virtual band, the virtual band being scanned a first time, according to a first channel sequence and a second time according to a second channel sequence, the first and second channel sequences being temporally symmetrical to each other, wherein:

(a) each base station performs translation of the RF signal at the channel frequency, sampling of the RF signal translated, and then baseband translation in digital mode by multiplication with phasors, the sampling being synchronous with a general clock, common to all the base stations;

(b) each base station estimates the attenuation coefficient of the transmission channel between the connected object and itself, in baseband, as well as a phase of arrival of a packet, called a phase of arrival, for each frequency channel of the first sequence and of the second sequence of channels;

(c) each base station sums the phases of arrival of packets relating to a same channel but to distinct sequences of channels to obtain an averaged phase of arrival for each channel ($\Phi_c^{[T,R_i]}$);

(d) each base station estimates the frequency offset ($\hat{\delta}_f^{[R_i]}$) between its sampling frequency and that of the transmitter, and then corrects the averaged phase of arrival for each channel by a phase error due to this frequency offset, so as to obtain an averaged and corrected phase of arrival ($\Phi'^{[T,R_i]}_c$);

(e) each base station transmits to a server the previously estimated attenuation coefficients and averaged and corrected phases of arrival;

(f) the server includes a previously trained neural network, the attenuation coefficients and the averaged and corrected phases of arrival for each base station of said plurality being provided to the input layer of the neural network and the output layer of the neural network providing an estimate of the position of the connected object.

* * * * *